United States Patent
Wang et al.

(10) Patent No.: US 11,943,640 B2
(45) Date of Patent: Mar. 26, 2024

(54) TECHNIQUE FOR GENERATING SYNTHETIC DATA FOR RADIO ACCESS NETWORK CONFIGURATION RECOMMENDATION

(71) Applicant: Telefonaktiebolaget LM Ericsson (publ), Stockholm (SE)

(72) Inventors: Yu Wang, Solna (SE); Wenfeng Hu, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 250 days.

(21) Appl. No.: 17/610,280

(22) PCT Filed: May 28, 2019

(86) PCT No.: PCT/EP2019/063799
§ 371 (c)(1),
(2) Date: Nov. 10, 2021

(87) PCT Pub. No.: WO2020/239203
PCT Pub. Date: Dec. 3, 2020

(65) Prior Publication Data
US 2022/0240106 A1  Jul. 28, 2022

(51) Int. Cl.
*H04W 24/02* (2009.01)
*G06N 3/045* (2023.01)
(Continued)

(52) U.S. Cl.
CPC .......... *H04W 24/02* (2013.01); *G06N 3/045* (2023.01); *G06N 3/088* (2013.01); *H04W 16/22* (2013.01)

(58) Field of Classification Search
CPC ...... H04W 24/02; H04W 16/22; G06N 3/045; G06N 3/088; G06N 3/047; G06N 3/006
(Continued)

(56) References Cited

U.S. PATENT DOCUMENTS

| 11,475,276 | B1 * | 10/2022 | Shrivastava | G06N 3/094 |
| 2019/0244609 | A1 * | 8/2019 | Olabiyi | G06N 3/047 |
| 2021/0241119 | A1 * | 8/2021 | Takahashi | G06N 3/045 |

OTHER PUBLICATIONS

ETSI Group Report, "Next Generation Protocols (NGP); Intelligence-Defined Network (IDN)", ETSI GR NGP 006 V1.1.1, Jun. 15, 2018, pp. 1-35.
(Continued)

*Primary Examiner* — Don N Vo
(74) *Attorney, Agent, or Firm* — COATS & BENNETT, PLLC

(57) ABSTRACT

A technique for generating synthetic data as input for a machine learning process that recommends radio access network, RAN, configurations is presented. An apparatus implementation is configured to generate synthetic data from a noise input, using a trained generative machine learning model, wherein the generative machine learning model has been trained together with a discriminative machine learning model as adversaries based on non-synthetic data. The non-synthetic data comprises non-synthetic configuration management, CM, parameter values, non-synthetic RAN characteristic parameter values and non-synthetic performance indicator values. The synthetic data is in the same form as the non-synthetic data and comprises synthetic configuration management, CM, parameter values, synthetic RAN characteristic parameter values and synthetic performance indicator values. The apparatus is also configured to output the synthetic data for the machine learning process.

20 Claims, 11 Drawing Sheets

(51) Int. Cl.
*G06N 3/088* (2023.01)
*H04W 16/22* (2009.01)

(58) Field of Classification Search
USPC ...................................... 455/422.1
See application file for complete search history.

(56) References Cited

OTHER PUBLICATIONS

Hong, Y. et al., "How Generative Adversarial Networks and Their Variants Work: An Overview", Cornell University Library, Nov. 16, 2017, pp. 1-41.
Yoon, J. et al., "Gain: Missing Data Imputation using Generative Adversarial Nets", Cornell University Library, Jun. 7, 2018, pp. 1-10.
Goodfellow, I. et al., "Generative Adversarial Nets", Cornell University Library, Jun. 10, 2014, pp. 1-9.
Wang, J. et al., "Irgan: A Minimax Game for Unifying Generative and Discriminative Information Retrieval Models", Cornell University Library, May 30, 2017, pp. 1-12.
Mirza, M. et al., "Conditional Generative Adversarial Nets", pp. 1-2, retrieved on Oct. 29, 2018, retrieved from internet http://arxiv.org/abs/1411.1784.
Miyato, T. et al., "cGANs with Projection Discriminator", pp. 1-8, retrieved on Oct. 29, 2018, retrieved from internet http://openreview.net/forum?id=ByS1VpgRZ.

\* cited by examiner

|  | Item1 | Item2 | Item3 | Item4 | Item5 | Item6 |
|---|---|---|---|---|---|---|
| User1 |  | 4 |  | 3 |  |  |
| User2 | 1 |  |  |  | 5 |  |
| User3 |  |  | 4 | 5 |  |  |

Fig. 1

|  | [cm1=1; cm2=2] | [cm1=2; cm2=1] | [cm1=1; cm2=1] |
|---|---|---|---|
| cellType1 | 3 dB | | |
| cellType2 | | | 2 dB |
| cellType3 | | 4.5 dB | 1 dB |

Input: training data set ϕ.
Output: trained G that is able to generate synthetic data
- Initialize $\theta_d$ for D and $\theta_g$ for G
- In each training iteration:

Train D
- Sample $m$ examples $\{(c^1, x^1), (c^2, x^2), \ldots, (c^m, x^m)\}$ from ϕ
- Sample $\{z^1, z^2, \ldots, z^m\}$ from a distribution ψ
- Obtaining generated data $\{\tilde{x}^1, \tilde{x}^2, \ldots, \tilde{x}^m\}$ where $\tilde{x}^i = G(c^i, z^i)$
- Sample $\{\hat{x}^1, \hat{x}^2, \ldots, \hat{x}^m\}$ from database which $\hat{x}^i$ is unpair with $c^i$
- Update discriminator parameters $\theta_d$ to maximize $\tilde{V}(\theta_d) = \frac{1}{m}\sum_{i=1}^{m} \log D(c^i, x^i) + \frac{1}{m}\sum_{i=1}^{m}\left[\log\left(1 - D(c^i, \tilde{x}^i)\right) + \log\left(1 - D(c^i, \hat{x}^i)\right)\right]$
  - The gradient $\nabla \tilde{V}(\theta_d)$ can be calculated directly since D is differentiable
  - $\theta_d \leftarrow \theta_d + \eta \nabla \tilde{V}(\theta_d)$

Train G
- Sample $m$ noise samples $\{z^1, z^2, \ldots, z^m\}$ from ψ
- Sample $m$ labels $\{c^1, c^2, \ldots, c^m\}$ from ϕ
- Update generator parameters $\theta_g$ to maximize $\tilde{V}(\theta_g) = \frac{1}{m}\sum_{i=1}^{m} \log\left(D\left(c^i, G(c^i, z^i)\right)\right)$
  - The gradient is calculated via REINFORCE
  - $\nabla \tilde{V}(\theta_g) = \frac{1}{m}\sum_{i=1}^{m}\left(D\left(c^i, G(c^i, z^i)\right)\right)\nabla \log P_{\theta_g}(G(c^i, z^i)|c^i, z^i)$
  - $\theta_g \leftarrow \theta_g + \eta \nabla \tilde{V}(\theta_g)$

Fig. 9

|  | [cm1=1; cm2=2] | [cm1=2; cm2=1] | [cm1=1; cm2=1] | [cm1=2; cm2=2] |
|---|---|---|---|---|
| cellType1 | 3 dB | *5.7 dB* | *2.6 dB* |  |
| cellType2 |  |  | 2 dB |  |
| cellType3 | *6.4 dB* | 4.5 dB | 1 dB | *0.3 dB* |
| *cellType4* |  |  | *1.6 dB* |  |

TECHNIQUE FOR GENERATING SYNTHETIC DATA FOR RADIO ACCESS NETWORK CONFIGURATION RECOMMENDATION

TECHNICAL FIELD

The present disclosure generally relates to machine learning. In more detail, the present disclosure relates to a machine learning process that recommends, based on synthetic data, a radio access network configuration, and the present disclosure also relates to generation of such synthetic data. The present disclosure can be implemented as an apparatus, a system, a method, and a computer-program product.

BACKGROUND

In radio access networks (RANs), each radio base station (RBS) has a large number of configurable parameters to control the behaviour of individual RBS functions. The maintenance and optimization of these parameters are the tasks of configuration management (CM), and the parameters are therefore also called CM parameters.

RBS vendors typically define a range of configurable values for each CM parameter. In reality, a mobile network operator uses the default or recommended values for most of the CM parameters in the entire mobile network. Evidently, this approach is a sub-optimal solution since the optimal CM parameter values usually depend on network conditions and optimization objectives.

The complexity of suitably configuring CM parameters increases dramatically with the number of CM parameters to tune per cell served by a given RBS, the number of cells in a given mobile network and the interdependency between the CM parameters. Besides, the CM parameter values of a given cell do not only affect the given cell, but also its neighbouring cells. Due to these complexities, it simply is impractical to manually configure CM parameters in RANs. Moreover, in the dawn of mobile networks of the 5th Generation (5G), selecting an optimal CM parameter configuration for an RAN is becoming even more challenging with more cells and more parameters per cell to manage. Automation will therefore be a requirement for future CM parameter configuration solutions.

Various efforts have already been made to automate optimization of CM parameter configuration. For example, self-organizing network (SON) functions have been designed with open or closed-loop expert rules and logics. More recently, machine learning (ML) approaches have also been applied to tackle the task from a data-driven perspective. Since the performance of most ML algorithms depends on the variety of data, the underlying algorithms require a large number of CM parameters settings for many cells as input data to recommend suitable CM parameter changes.

Existing solutions for CM parameter optimization thus include manual tuning, SON functions and ML-based approaches. For the reasons indicated above, manual tuning is limited to small areas and a very limited set of CM parameters due to the inherent complexity, and network wide cell-level fine tuning is impractical when done manually.

Most SON functions are built on expert rules for guided step-by-step adjustment of certain CM parameters in each cell. While the expert rules are carefully designed with local domain knowledge, it is not feasible to define and maintain rules for each one of possibly hundreds of CM parameters. Besides, the outcome of the adjustment is usually judged by certain performance metrics over days, and the adjustment is continued or reverted in a closed loop depending on the observation. Therefore, it is usually a time-consuming and slow process, and close-loop approaches take weeks or months to optimize one single CM parameter.

ML-based solutions are data driven with less human intervention. For ML-based solutions, optimizing a CM parameter configuration for an RAN can be modelled as a so-called recommender system, which implies that this approach also inherits the challenge of building a recommender system.

Since in live mobile networks most cells only experience very few configuration changes, the available data input for CM parameter recommendation is sparse. On the one hand, there exist many theoretically possible, but in practice unobserved CM parameter settings that will never be available as data input for CM parameter recommendation. On the other hand, performance of a recommender system based on sparse data input is expected to be poor. For this reason, ML-based solutions to the challenge of optimizing RAN configurations have not yet been widely adopted.

SUMMARY

There is a need for a technique that overcomes the limitations of insufficient data input for RAN configuration recommendation.

According to a first aspect, an apparatus for generating synthetic data as input for a machine learning process that recommends RAN configurations is presented. The apparatus is configured to obtain a noise input and generate, using a trained generative machine learning model, synthetic data from the noise input. The generative machine learning model has been trained together with a discriminative machine learning model as adversaries based on non-synthetic data associating configuration management, CM, parameter values, RAN characteristic parameter values and performance indicator values, wherein each performance indicator value indicates a performance for a given RAN configuration as defined by one or more of the non-synthetic CM parameter values and a given RAN characteristic as defined by one or more of the non-synthetic RAN characteristic parameter values. The synthetic data is in the same form as the non-synthetic data and comprises at least one of one or more synthetic CM parameter values, one or more synthetic RAN characteristic parameter values and one or more synthetic performance indicator values. Furthermore, the apparatus is configured to output the synthetic data for the machine learning process.

As understood herein, the term "value" includes a continuous value, a discrete value (e.g., a particular CM parameter setting), a set of discrete values and a range of values (e.g., defined by one or both of a start value and an end value).

The non-synthetic CM parameter values (including CM parameter settings) and the non-synthetic RAN characteristic parameter values may be authentic data as obtained from one or more RANs in a live or testing environment or by simulation. The performance indicator values may also be non-synthetic. They may be derived from one or more RANs in a live or testing environment or by simulation. The synthetic data may also comprise one or more synthetic performance indicator values. The RAN characteristic parameter values may be non-configurable. The RAN characteristic parameter values may have been obtained from measurements. The RAN characteristic parameter values may have a dependence on CM parameters.

In the non-synthetic data the non-synthetic CM parameter values and the non-synthetic RAN characteristic parameter values may be associated with each other.

The association may be represented in the form of a data structure, for example a matrix with columns and rows populated by the non-synthetic CM parameter values and the non-synthetic RAN characteristics parameter values, respectively. The synthetic CM parameter values and the synthetic RAN characteristic parameter values may be used to supplement the data structure (e.g., the rows and columns).

Each performance indicator value may be associated with a dedicated combination of at least one non-synthetic CM parameter value and at least one non-synthetic RAN characteristic parameter value. As an example, each performance indicator may have been obtained for a given combination of one or more non-synthetic CM parameter values and one or more non-synthetic RAN characteristic parameter values.

Each RAN characteristic may be representative of an RAN cell type. The non-synthetic RAN parameter characteristic values may define multiple different RAN characteristics and, thus, multiple different RAN cell types. For example, each RAN cell type may be classified by a unique RAN characteristic parameter value or a unique combination of two or more RAN characteristic parameter values.

The trained generative machine learning model and the trained discriminative machine learning model may be part of a generative adversarial network, GAN. The GAN may be built from neural networking, NN, resources.

In some implementations, the apparatus may also be configured to obtain conditional values. The trained generative machine learning model may be configured to generate the synthetic data also from the conditional values.

The conditional values may comprise one or more non-synthetic or synthetic performance indicator values and/or one or more non-synthetic RAN characteristic parameter values. These conditional values may be used as input for the generative machine learning model and/or the discriminative machine learning model.

The generative machine learning model and the discriminative machine learning model may each be configured (e.g., by NN resources) as a GAN or a conditional generative adversarial network, cGAN. The GAN or cGAN may be configured to generate the synthetic data (i.e., the one of more synthetic CM parameter values and/or the one or more synthetic RAN characteristic parameter values and/or the one or more synthetic performance indicator values).

As opposed to a GAN, the cGAN conditions the generative machine learning model and the discriminative machine learning model on the afore-mentioned conditional values. In more detail the generative machine learning model of a cGAN learns to generate the synthetic data with different properties in dependence of the conditional values. In a similar manner, the discriminative machine learning model of a cGAN classifies the input into a predicted class. The discriminative machine learning model learns to not only distinguish between the synthetic and non-synthetic data, but also learns whether the input satisfies the conditional values by checking whether the predicted class matches a true class associated with the conditional values.

The apparatus may be configured to obtain an input of either the synthetic data or the non-synthetic data. The apparatus may be configured to classify the input of either the synthetic data or the non-synthetic data into a first predicted class of either a class of synthetic data or a class of non-synthetic data. The apparatus may be configured to output a first probability representing a confidence of the trained discriminative model that the first predicted class matches the class of synthetic data or the class of non-synthetic data. The synthetic data as output by the trained generative machine learning model may selectively be used for the machine learning process if the first probability as output by the trained discriminative model on the input of the synthetic data meets a predefined first condition (e.g., a thresholding condition).

The apparatus may further be configured to classify the input, using the trained discriminative machine learning model, into a second predicted class of multiple classes each matching one specific set of conditional values and to output a second probability representing a confidence of the trained discriminative machine learning model that the second predicted class matches a class of the obtained conditional values. The synthetic data as output by the trained generative machine learning model may then selectively be used for the machine learning process if the second probability (pc) as output by the trained discriminative model on the input of synthetic data meets a predefined second condition (e.g., a thresholding condition).

One or more of these processing steps, in particular the classifying steps, may be performed using NN processing. NN processing in one or more of these processing steps may be performed by a dedicated NN. The first classification result may be based on a result of the evaluation of the input and the second classification result may be based on the evaluation of the matching between the input and the conditional values.

In some implementations, the result of the first classification is a first confidence parameter indicative of whether the synthetic data can be regarded as an authentic, or realistic, input for the machine learning process. The result of the second classification may be a second confidence parameter indicative of whether the synthetic data satisfies the conditional values. The apparatus may be configured to determine if the result of the first classification (e.g., the first confidence parameter) to meet a predefined first condition (e.g., based on a first threshold decision) to decide whether or not to use the synthetic data as input for the machine learning process. The apparatus may also be configured to subject the result of the second classification (e.g., the first confidence parameter) to meet a predefined second condition (e.g., based on a second threshold decision) to decide whether or not to use the synthetic data as input for the machine learning process.

The trained generative machine learning model may have been trained using a gradient-based optimization process. In some variants, the trained generative machine learning model is configured to generate one or more discrete data values comprised by the synthetic data.

The apparatus may be configured to be operated offline in regard to a given RAN for which the RAN configuration is to be determined. The apparatus may be located at site remote from a site at which RBSs of the given RAN are located.

One or more of the non-synthetic CM parameter values, the non-synthetic RAN characteristic parameter values and the performance indicator values may have been derived from one or more operative ("live") RANs. Alternatively, or in addition, one or more of the non-synthetic CM values, the non-synthetic RAN characteristic parameter values and the performance indicators may have been derived from a testing environment or by simulation.

At least one of the one or more non-synthetic CM parameter values may have been obtained by converting a categorical CM parameter (e.g., yes/no or on/off) into a numerical CM parameter (e.g., 1/0). Alternatively, or in addition, at least one of the one or more non-synthetic CM parameter values has been obtained by a dimension reduction technique.

The apparatus may further be configured to use a machine learning process to provide recommendations for RAN configurations based on the non-synthetic data and the synthetic data. The apparatus may in particular be configured to train the machine learning process based on the non-synthetic and the synthetic data, to recommend one or more CM parameter values using the trained recommendation process, and to output the one or more recommended CM parameter values for RAN configuration. The apparatus, in particular in the context of the machine learning process, may further be configured to evaluate candidates for the one or more recommended CM parameter values based on one or more of the non-synthetic CM parameter values, the non-synthetic RAN characteristic parameter values, and the non-synthetic performance indicator values, wherein the synthetic data (e.g., the synthetic CM parameter values and the synthetic RAN characteristic parameter values) are excluded from evaluation purposes. As such, the synthetic data may not be used for evaluation purposes.

The apparatus, in particular in the context of the machine learning process, may be configured to process the synthetic data and the non-synthetic data in matrix form using a matrix factorization approach. The apparatus may be configured to output, for a given RAN or RAN cell type associated with one or more given RAN characteristic parameter values, the one or more CM parameter values associated that fulfil a predefined criterion in regard to one or more performance indicators. The criterion may be a criterion selected such that the one or more CM parameter values associated with the best performance in regard to one or more performance indicators are output. Alternatively or in addition, a thresholding criterion may be applied.

According to a second aspect, an apparatus is presented for training a generative machine learning model that outputs synthetic data as an input for a machine learning process that recommends RAN configurations, wherein the generative machine learning model is trained together with a discriminative machine learning model as adversaries. The apparatus is configured to obtain a noise input and to obtain non-synthetic data associating CM parameter values, RAN characteristic parameter values and performance indicator values, wherein each performance indicator value indicates a performance for a given RAN configuration as defined by one or more of the non-synthetic CM parameter values and a given RAN characteristic as defined by one or more of the non-synthetic RAN characteristic parameter values. The apparatus is further configured to generate, using the generative machine learning model, synthetic data from the noise input, the synthetic data, in the same form as the non-synthetic data, comprising at least one of one or more synthetic CM parameter values, one or more synthetic RAN characteristic parameter values and one or more synthetic performance indicator values. Also, the apparatus is configured to obtain an input of either the synthetic data or the non-synthetic data and a corresponding true class, to classify the input, using the discriminative machine learning model, into a first predicted class of either a class of synthetic data or a class of non-synthetic data, to update the discriminative machine learning model by minimizing an error based on a deviation between the first predicted class and the true class, and to update the generative machine learning model by maximizing the error of the discriminative machine learning model.

The training apparatus may be configured to update the discriminative machine learning model based on a gradient derived from the deviation between the first predicted class and the true class by using a gradient-based optimization process. IN particular, the training apparatus may be configured to update the generative machine learning model based on an inverse of the gradient using a gradient-based optimization process. The training apparatus may be configured to update the generative machine learning model using reinforcement techniques.

Also presented is a training and data generation system, comprising the apparatus according to the first aspect for generating synthetic data using a generative machine learning model the apparatus according to the second aspect for training the generative machine learning model.

Further presented is a system for recommending RAN configurations comprising the apparatus according to the first aspect for generating synthetic data and a machine learning apparatus configured to be trained at least based on the synthetic data and to recommend one or more CM parameter values for the RAN.

A first method aspect relates to a method for generating synthetic data as input for a machine learning process that recommends RAN configurations, the method comprising obtaining a noise input and generating, using a trained generative machine learning model, synthetic data from the noise input, wherein the generative machine learning model has been trained together with a discriminative machine learning model as adversaries based on non-synthetic data associating non-synthetic CM parameter values, non-synthetic RAN characteristic parameter values and non-synthetic performance indicator values, wherein each non-synthetic performance indicator value indicates a performance for a given RAN configuration as defined by one or more of the non-synthetic CM parameter values and a given RAN characteristic as defined by one or more of the non-synthetic RAN characteristic parameter values, the synthetic data, in the same form as the non-synthetic data, comprising at least one of one or more synthetic CM parameter values, one or more synthetic RAN characteristic parameter values and one or more synthetic performance indicator values. The method further comprises outputting the synthetic data for the machine learning process.

The first method aspect may be performed by the apparatus of the first aspect as presented herein.

A second method aspect relates to a method for training a generative machine learning model that outputs synthetic data as an input for a machine learning process that recommends RAN configurations, wherein the generative machine learning model is trained together with a discriminative machine learning model as adversaries. The method comprises obtaining a noise input and obtaining non-synthetic data associating CM parameter values, RAN characteristic parameter values and performance indicator values, wherein each performance indicator value indicates a performance for a given RAN configuration as defined by one or more of the non-synthetic CM parameter values and a given RAN characteristic as defined by one or more of the non-synthetic RAN characteristic parameter values. The method further comprises generating, using the generative machine learning model, synthetic data from the noise input, the synthetic data, in the same form as the non-synthetic data, comprising at least one of one or more synthetic CM parameter values, one or more synthetic RAN characteristic parameter values and one or more synthetic performance indicator values. Moreover, the method comprises obtaining an input of either the synthetic data or the non-synthetic data and a corresponding true class, classifying the input, using the discriminative machine learning model, into a first predicted class of either a class of synthetic data or a class of non-synthetic data, updating the discriminative machine learning model by minimizing an error based on a deviation between the first predicted class and the true class, and updating the generative machine learning model by maximizing the error of the discriminative machine learning model.

The second method aspect may be performed by the apparatus of the second aspect as presented herein.

Also provided is a computer program product comprising program code portions that, when executed by at least one processor, configure the at least one processor to perform the method of the first and/or second method aspect. The computer program product may be stored on a computer-readable recording medium.

BRIEF DESCRIPTION OF THE DRAWINGS

Further aspects, details and advantages of the present disclosure will become apparent from the detailed description of exemplary embodiments below and from the drawings, wherein:

FIG. 1 is a diagram illustrating a matrix representation of a recommendation problem used for illustration purposes in connection with the present disclosure;

FIG. 7 is a diagram illustrating a matrix representation of a recommendation problem according to an embodiment of the present disclosure;

FIG. 9 is a schematic diagram illustrating a training process for the cGAN-based synthetic data generation apparatus embodiment of FIG. 8;

FIG. 11 is a diagram based on FIG. 7 that illustrates a matrix representation that has been enriched with synthetic data generated by the cGAN-based synthetic data generation apparatus embodiment of FIG. 8.

DETAILED DESCRIPTION

Figure 2B:
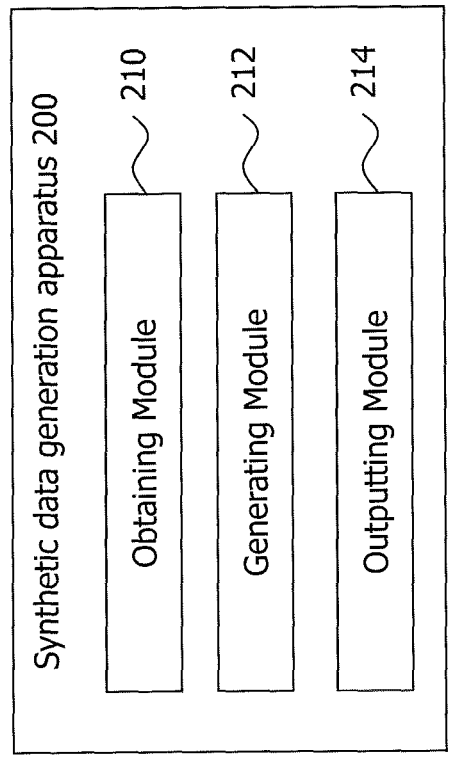
FIGS. 2A, 2B are block diagrams illustrating two synthetic data generation apparatus embodiments of the present disclosure.

In the following description, for purposes of explanation and not limitation, specific details are set forth in order to provide a thorough understanding of the present disclosure. It will be apparent to one skilled in the art that the present disclosure may be practiced in other embodiments that depart from these specific details.

While, for example, the following description focuses on exemplary NN implementations, the present disclosure is not limited in this regard. For example, any machine learning approach that that is based on a generator-discriminator approach could be implemented to fulfil the same purpose. Moreover, while the present disclosure will be explained in the context of exemplary types of CM parameters and RAN characteristic parameters, it will be readily apparent that other parameter types may be used as well. Additionally, the present disclosure is not limited to recommending cell-level configurations, although some of the following embodiments will be discussed in this specific context.

Those skilled in the art will further appreciate that the steps, services and functions explained herein may be implemented using individual hardware circuits, using software functioning in conjunction with a programmed microprocessor or general purpose computer, using one or more Application Specific Integrated Circuits (ASICs) and/or using one or more Digital Signal Processors (DSP). It will also be appreciated that when the present disclosure is described in terms of a method, it may also be embodied in one or more processors and one or more memories coupled to the one or more processors, wherein the one or more memories store one or more computer programs that perform the steps, services and functions disclosed herein when executed by one or more processors.

In the following description of exemplary embodiments, the same reference numerals denote the same or similar components.

The present disclosure provides, inter alia, a machine learning-based recommendation approach for RAN configurations (as defined, for example, by a combination of multiple CM parameter values that optimize RAN operation). In general, machine learning-based recommendation approaches provide, or recommend, items to users based on predicted ratings of the users on the items, and the prediction is done by analyzing known relationships between the users and the items. Such recommendation processes are based on the insight that two or more users who have given similar ratings on one or more items tend to also give a similar rating to an unrated or new item. For this reason ratings can be predicted for relationships between a user and unrated items based on the ratings of other users with similar rating preferences.

Recommendation approaches have previously been applied for item recommendation to customers in online shopping, article recommendation to news subscribers, book recommendation to readers, and so on. The task is to recommend new items (e.g., books) to users by predicting the users' ratings on unrated items. A common approach is collaboration-based, which gives ratings based on user/item interactions. The interaction can be represented by a user/item matrix as shown in FIG. 1, in which the number in a given field represents the rating of a user on an item. As an example, user User1 has rated item Item2 with a rating of "4".

Matrices of the type illustrated in FIG. 1 are usually sparse as a user usually only interacts with a small subset of all items. Techniques have thus been developed to cope with the sparse nature of the data, such as matrix factorization with deep learning. Evidently, recommendation accuracy improves as more rating data becomes available.

In some implementations of the present disclosure, it is suggested to model CM parameter optimization as a recommendation problem. In the scenario illustrated in FIG. 1, for example, different types of RANs or RAN portions (e.g., RAN cells) could take the role of users, CM parameter values could take the role of items, and performance indicator (e.g., key performance indicator, KPI) values could take the role of item ratings. The different types of RANs or RAN portions could be defined using different RAN characteristic parameter values. Eventually, the task will be to find the CM parameter values giving the best performance for a certain type of cell (or other RAN portion or a RAN as a whole).

Since in live mobile networks most cells only experience very few configurations changes, the typical user/item (cell type/CM parameter) matrix for CM recommendation will be very sparse. The performance of a recommender system based on such a sparse matrix is expected to be poor, especially for unobserved CM parameter settings. One may thus think of "enriching" data structures of the type illustrated in FIG. 1, or similar data structures, with synthetic data that have been generated based on the available non-synthetic, or authentic, data.

Most machine learning (ML) algorithms (e.g., for a user recommendation problem) require a large amount of data to work properly. In this context, modelling-based approaches such as generative adversarial networks (GANs) can be used for synthetic data generation. A GAN can be used to create supplementary synthetic data that belongs to the same (or at least similar) distribution as the true non-synthetic data. GAN technology is exemplarily discussed in Goodfellow et al., "Generative Adversarial Nets" (https://papers.nips.cc/paper/5423-generative-adversarial-nets.pdf).

A GAN, as usable in the some implementations of the present disclosure, contains a generator network usually receiving a noise input z as input and outputting synthetic data in form of a vector $\tilde{x}$, and a discriminator network that tries to estimate the probability whether a given input of either non-synthetic data x or synthetic data $\tilde{x}$ belongs to a true distribution $p(x)$ or a synthetic data distribution $p(\tilde{x})$. These two networks compete against each other during training, the discriminator trying to detect the output of the generator as synthetic and the generator focusing on fooling the discriminator to classify the synthetic data as non-synthetic. The generator network typically never gets to see any true (i.e., non-synthetic) data, but it updates its weights based on the output of the discriminator. At first, both networks will perform very poorly, but because they are adversaries playing a zero-sum game, each trying to "outsmart" the other, they are forced to improve whenever their opponent improves, until at the end (in theory) the generator exactly reproduces the true data distribution and the discriminator is guessing at random, unable to find any difference.

Conditional GANs (cGAN) enhance the original GAN by adding conditional values c as side information to the generator for generating data that satisfy the conditional values. cGAN technology is exemplarily discussed in M. Mirza et a., "Conditional Generative Adversarial Nets" (https://arxiv.org/abs/1411.1784) and T. Miyato et al. "cGANs with projection discriminator" (published as a conference paper at ICLR 2018, see https://openreview.net/forum?id=ByS1VpgRZ). The conditional values c are also added to the discriminator input to distinguish whether the generated data satisfies the conditional values. The following embodiments focus on cGAN technology, although GAN technology could be used as well.

J. Yoon et al. in "GAIN: Missing Data Imputation using Generative Adversarial Nets" (http://proceedings.mlr.press/v80/yoon18a/yoon18a.pdf) propose an approach to derive missing data using a GAN, wherein the generator observes some components of a vector of authentic (i.e., non-synthetic) data, derives the missing components conditioned on what is actually observed, and outputs a completed vector. The discriminator then takes the completed vector and attempts to determine which components were actually observed and which were derived.

Traditional GAN approaches such as described by J. Yoon et al. mainly focus on continuous data generation, such as for example pictures and audio signals. However, the data of interest in the present context (i.e., CM parameter values together with RAN characteristic values on, e.g. a cell level) inherently has a discrete property. For example, a certain CM parameter may only have few integral candidates to select from (such as 0 and 1; 1, 2, 3 and 4; 10, 100, 1000; etc.). Applying the original GAN or cGAN framework to this kind of discrete data generation will typically not be feasible because the generator needs to draw discrete sample values and this sampling step make the loss function of the generator undifferentiable. J. Wang et al. in "Irgan: A minimax game for unifying generative and discriminative information retrieval models" (https://arxiv.org/pdf/1705.10513.pdf) propose using the mini-max game framework to train Information Retrieval (IR) systems, including recommender system. The requirement underlying the present disclosure is, however, different in that the focus is to generate unobserved ("synthetic") data to improve performance of a recommender system, and J. Wang et al. intend to select relevant items from a given items pool. In the present context that will be described in greater detail below, a modified GAN or cGAN is proposed that uses reinforcement techniques to train the generator network in order to overcome the problem of non-differentiable discrete values.

In the following, embodiments of generating synthetic data for RAN configuration recommendation will be presented.

Figure 2A:
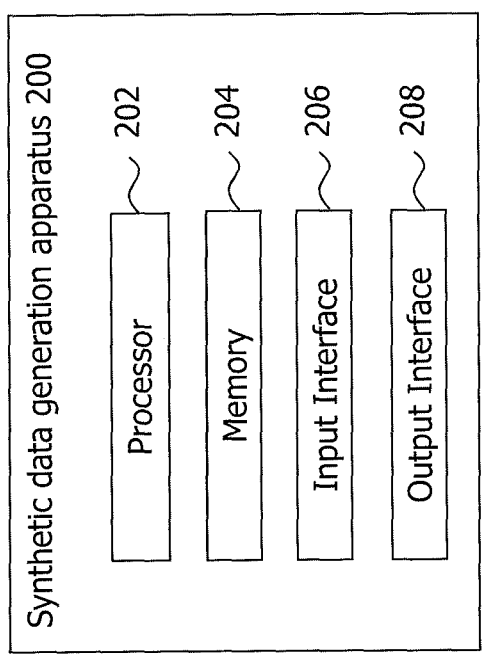

FIGS. 2A and 2B illustrate two embodiments of a synthetic data generation apparatus 200. In the embodiment illustrated in FIG. 2A, the synthetic data generation apparatus 200 comprises a processor 202 and a memory 204 coupled to the processor 202. The synthetic data generation apparatus 200 further comprises an optional input interface 206 and an optional output interface 208. The memory 204 stores program code that controls operations executed by the processor 202.

The processor 202 is adapted to obtain, via the input interface 206, a noise input. The processor 202 is also configured to generate, using a trained generative machine learning model, synthetic data from the noise input. The processor 202 is still further configured to output, via the output interface 208, the synthetic data.

FIG. 2B shows an embodiment in which the synthetic data generation apparatus 200 is implemented in a modular configuration. As shown in FIG. 2B, the synthetic data generation apparatus 200 comprises an obtaining module 210 configured to obtain noise input, a generation module 212 configured to generate synthetic data from the noise input, and an outputting module 214 configured to output the synthetic data.

Figure 3B:
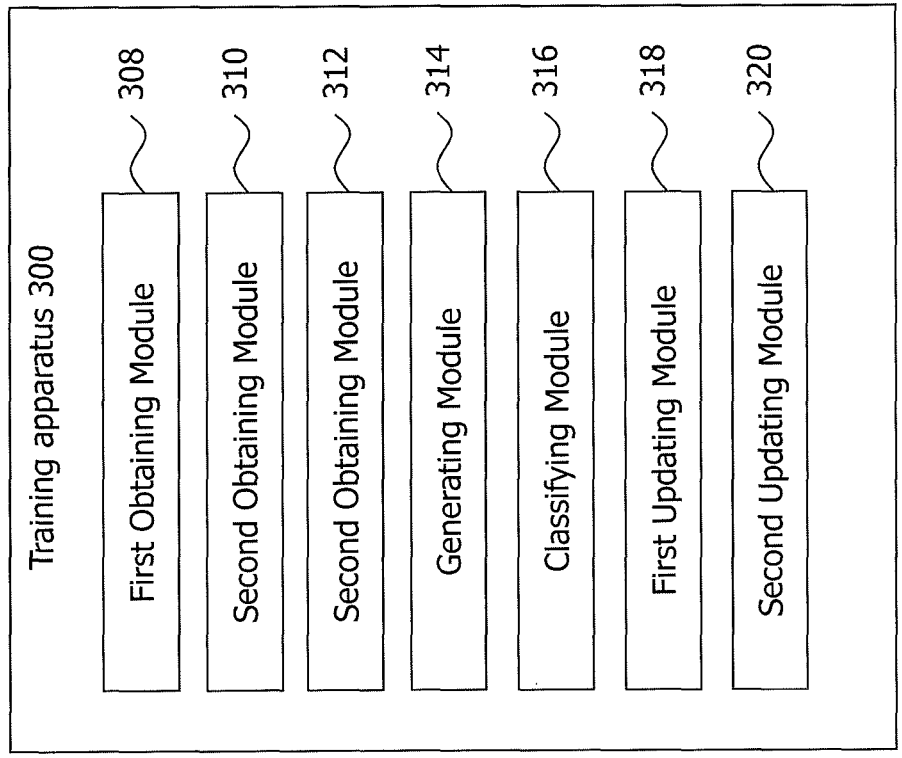
FIGS. 3A, 3B are block diagrams illustrating two training apparatus embodiments in accordance with the present disclosure.
Figure 3A:
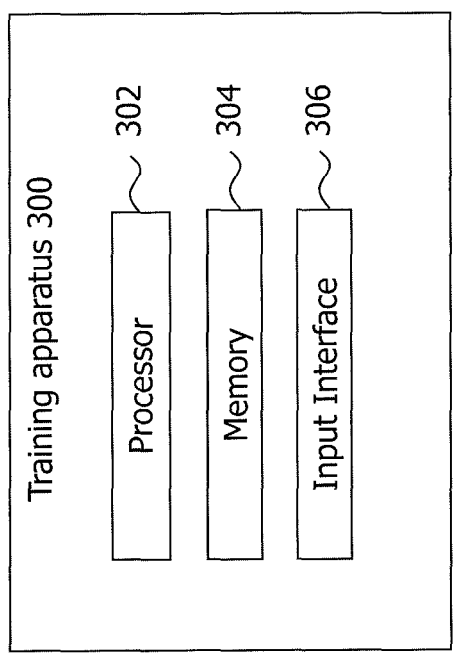

FIGS. 3A and 3B illustrate two embodiments of a training apparatus 300. In the embodiment illustrated in FIG. 3A, the training apparatus 300 comprises a processor 302 and a memory 304 coupled to the processor 302. The training apparatus 300 further comprises an optional input interface 306. The memory 304 stores program code that controls operations executed by the processor 302.

The processor 302 is adapted to obtain, via the input interface 306, a noise input, non-synthetic data comprising non-synthetic CM parameter values, non-synthetic RAN characteristic parameter values as well as non-synthetic performance indicator values. The processor 302 is further configured to generate, using a generative machine learning model, synthetic data from the noise input, the synthetic data comprising at least one of one or more synthetic CM parameter values, one or more synthetic RAN characteristic parameter values and one or more synthetic performance indicator values. The processor 302 is also configured to distinguish between an input of either the synthetic data or the non-synthetic data, using a discriminative machine learning model, by classifying the input into a first predicted class of either a class of non-synthetic data or a class of synthetic data. The processor 302 is further configured to update the discriminative machine learning model by minimizing an error based on a deviation between the first predicted class and a true class associated with the input. The processor 302 is also configured to update the generative machine learning model by maximizing the error.

FIG. 3B shows an embodiment in which the training apparatus 300 is implemented in a modular configuration. As shown in FIG. 3B, the training apparatus 300 comprises a first obtaining module 308 configured to obtain the noise input, a second obtaining module 310 configured to obtain the non-synthetic data, a third obtaining module 3120 configured to obtain an input of either the synthetic data or the non-synthetic data and a true class, a generating module 314 configured to generate the synthetic data, a classifying module 316 configured to classify the input into the first predicted class, a first updating module 318 configured to update the discriminative machine learning model, and a second updating module 320 configured to update the generative machine learning module.

Figure 4:
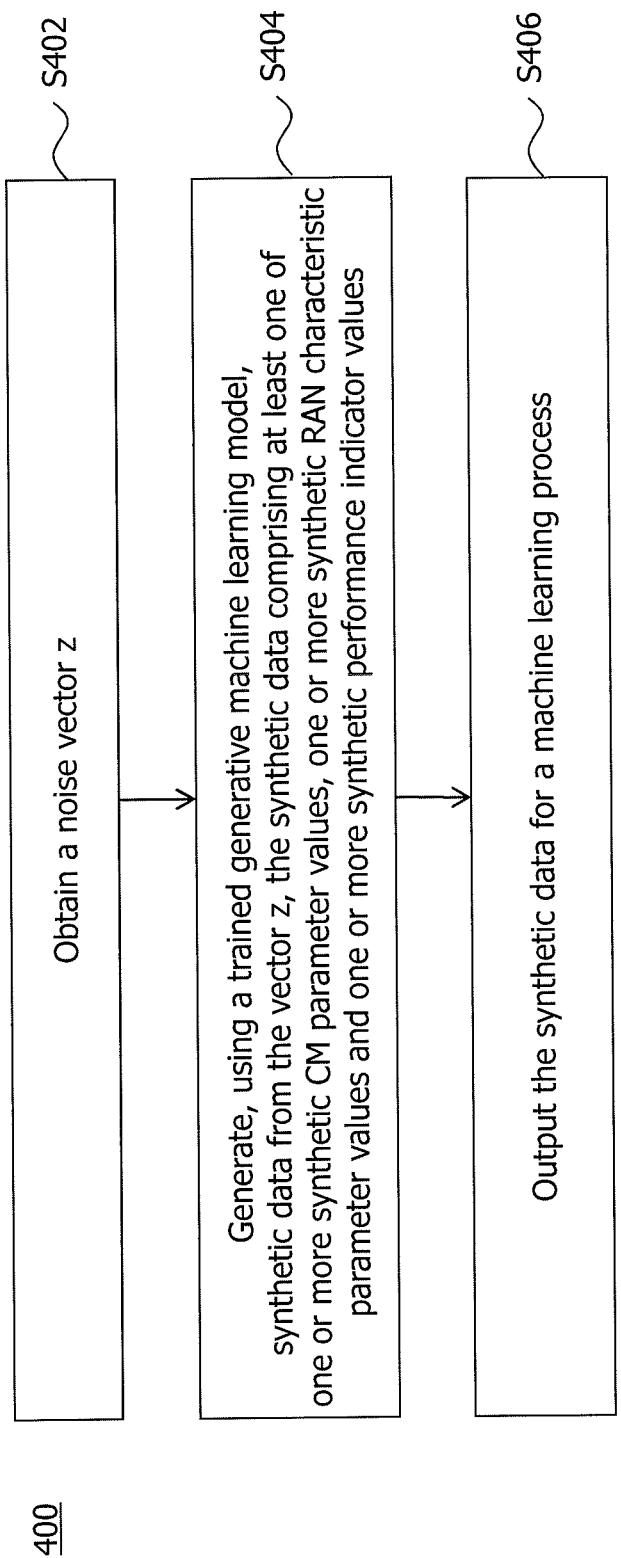
FIG. 4 is a flow diagram illustrating a method embodiment of the present disclosure.

FIG. 4 illustrates in a flow diagram 400 a method embodiment of the present disclosure. The method embodiment of FIG. 4 may be performed by any of the synthetic data generation apparatus embodiments of FIGS. 2A and 2B.

In FIG. 4 the synthetic data generation apparatus 200 initially obtains in step S402 a noise input. It will in the following be assumed that the noise input is received in the form of a vector (i.e., as a noise vector).

In step S404, the synthetic data generation apparatus 200 generates, using a trained generative machine learning model, synthetic data from the noise vector. Step S404 can be performed by a generator of a cGAN.

The synthetic data comprises at least one of one or more synthetic CM parameter values, one or more synthetic RAN characteristic parameter values and one or more synthetic performance indicator values. The generative machine learning model has been trained together with a discriminative machine learning model as adversaries based on non-synthetic data associating non-synthetic configuration management, CM, parameter values, non-synthetic RAN characteristic parameter values and non-synthetic performance indicator values. Each non-synthetic performance indicator value indicates a performance for a given RAN configuration as defined by one or more of the non-synthetic CM parameter values and a given RAN characteristic as defined by one or more of the non-synthetic RAN characteristic parameter values.

The synthetic data, in the same form as the non-synthetic data, comprise at least one of one or more synthetic CM parameter values, one or more synthetic RAN characteristic parameter values and one or more synthetic performance indicator values.

As understood here, the term "in the same form" may refer to the same data format as the non-synthetic data input.

Further, in step S406, the synthetic data generation apparatus 202 outputs the synthetic data as an input for a machine learning process. The machine learning process will recommend RAN configurations (e.g., in terms of CM parameter values).

Figure 5:
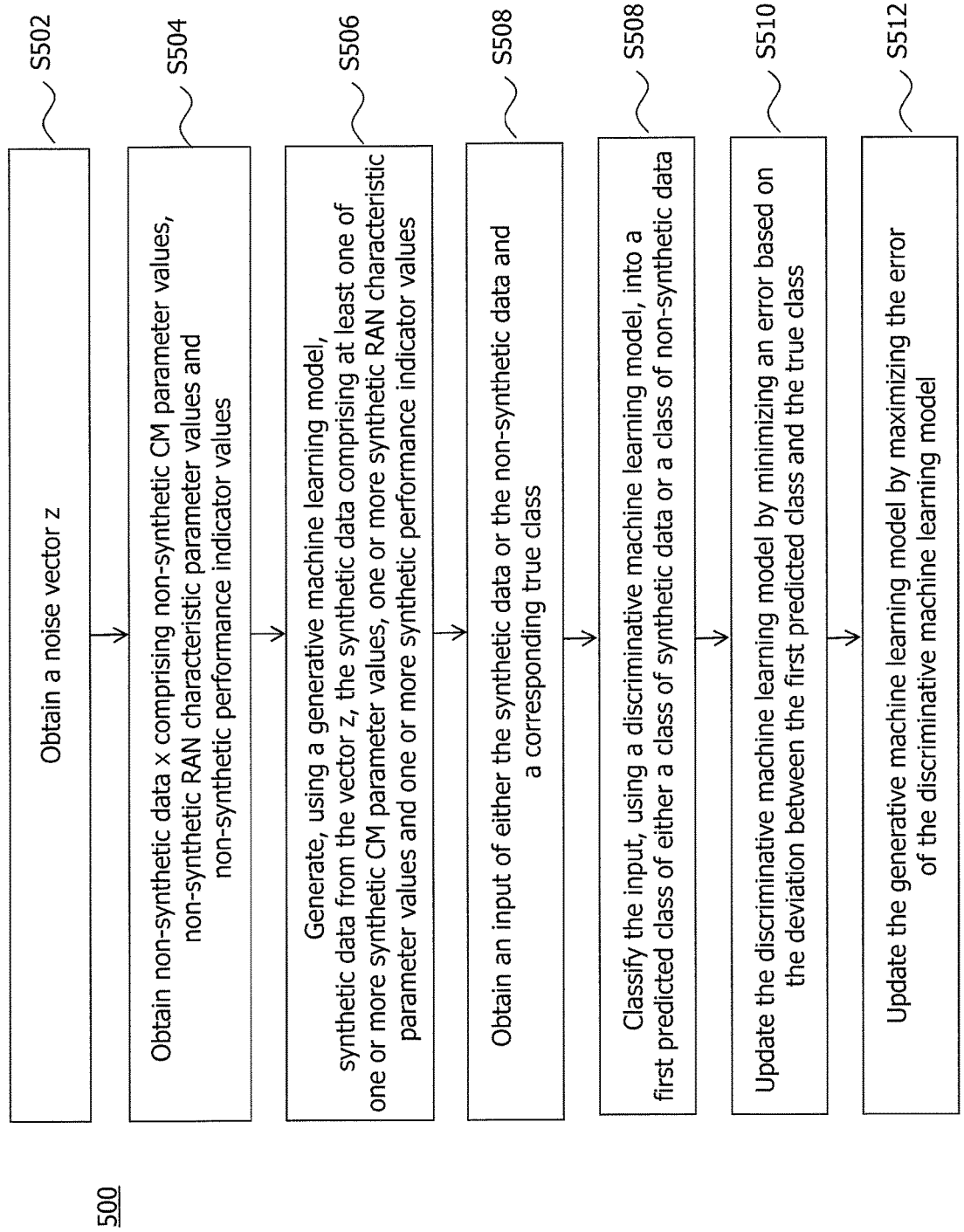
FIG. 5 is a flow diagram illustrating a further method embodiment of the present disclosure.

FIG. 5 illustrates in a flow diagram 500 a further method embodiment of the present disclosure. The method embodiment of FIG. 5 may be performed by any of the training apparatus embodiments of FIGS. 3A and 3B to train a generative machine learning model that outputs synthetic data as an input for a machine learning process that recommends RAN configurations. Here, the generative machine learning model is trained together with a discriminative machine learning model as adversaries.

In FIG. 5, the training apparatus 300 initially obtains in step S502 a noise input in the form of a noise vector z.

The training apparatus 300 also obtains, in step S504, non-synthetic data comprising non-synthetic CM parameter values, non-synthetic RAN characteristic parameter values and non-synthetic performance indicator values. In more detail, the non-synthetic data associate CM parameter values, RAN characteristic parameter values and performance indicator values, wherein each performance indicator value indicates a performance for a given RAN configuration as defined by one or more of the non-synthetic CM parameter values and a given RAN characteristic as defined by one or more of the non-synthetic RAN characteristic parameter values.

In step S506, the training apparatus 300 generates, using a generative machine learning model, synthetic data from the noise vector. The synthetic data comprises, in the same form as the non-synthetic data, at least one of one or more synthetic CM parameter values, one or more synthetic RAN characteristic parameter values and one or more synthetic performance indicator values. Step S506 can be performed by a generator of a cGAN.

In step S508, the training apparatus 300 obtains an input of either the synthetic data or the non-synthetic data and a corresponding true class and then, in step S510, classifies the input, using the discriminative machine learning model, into a first predicted class of either a class of synthetic data or a class of non-synthetic data.

In step S510, the training apparatus 300 updates the discriminative machine learning model by minimizing an error based on a deviation between the first predicted class and the true class and, in step S512, updates the generative machine learning model by maximizing the error of the discriminative machine learning model. In more detail, step S512 may comprise maximizing a probability of the synthetic data being predicted as a class of non-synthetic data by the discriminative machine learning model.

Figure 6:
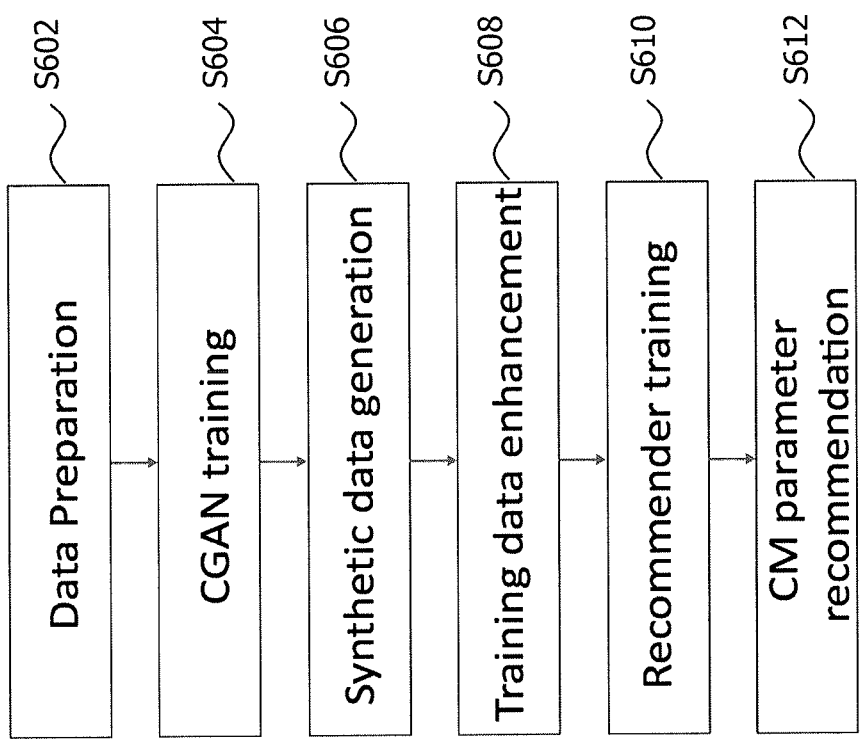
FIG. 6 is a flow diagram illustrating a still further method embodiment of the present disclosure.

FIG. 6 illustrates a flow chart 600 a more detailed method embodiment of the present disclosure that can be based on the general aspects discussed above with reference to FIGS. 1 to 5. The embodiment will be described in the exemplary context of a cell-level implementation. It will be appreciated that the present disclosure could also be implemented on other RAN levels.

In an initial step S602 data preparation takes place. Step S602 may precede steps is S502 and S504 in FIG. 5 or may be performed during these steps.

Data preparation includes obtaining authentic (i.e., non-synthetic) training data for the training apparatus 300 and optional pre-processing of the training data. Values (including settings) for CM parameters, cell characteristic parameters and cell-level performance indicators are obtained from one or multiple live mobile networks or otherwise (e.g., from a test environment or by simulation).

In an matrix representation derived from FIG. 1, cell types as defined by values of one or more cell characteristic parameters (including cell characteristic parameter combinations) may represent users, CM parameter configurations as defined by values of CM parameters (including CM parameter combinations) may represent items, and KPI or other performance values may represent ratings. As an example, an individual cell type ("user") may be represented by a first value for a first cell characteristic parameter and a second value for a second cell characteristic parameter. In a similar manner, an individual CM parameter configuration ("item") may be represented by a first value for a first CM parameter and a second value for a second CM parameter. In the context of the present disclosure, a value can be indicative of a discrete value (e.g., 10) or of a range of values (e.g., the starting or end point of a range of values). Data pre-processing such as dimension reduction and embedding techniques may also be performed in step S602 as needed.

Then, in step S604, the training apparatus 300 (e.g., a cGAN or similar NN-based model) is trained with the (optionally pre-processed) training data obtained in step S602. Step S604 may correspond to the procedure illustrated in the flow diagram of FIG. 5. After the training is completed, the trained cGAN is used as the synthetic data generation apparatus 200.

In step S606, which may correspond to the procedure illustrated in the flow diagram of FIG. 4, the trained synthetic data generation apparatus 200 is operated to generate synthetic data. As explained above, the synthetic data include one or more synthetic CM parameter values, one or more synthetic cell characteristic parameter values, and/or one or more performance indicator values. Optionally, a classification of the synthetic data might take place, using a discriminator of the cGAN, in order to determine whether the synthetic data can be regarded as realistic or not and, therefore, to determine whether the synthetic data can actually be used as input for the machine learning process.

In step S608, the non-synthetic data for training the cGAN are enhanced with the synthetic data. The result may correspond to an extended matrix representation (similar to FIG. 1), in which not only the non-synthetic training data obtained in step S602 are included, but also the synthetic data generated in step S606.

In step S610, both the generated synthetic data and the non-synthetic data are used to train the recommender, i.e., the actual ML process. The concrete details of the recommender algorithm are of minor importance. For instance, a collaborative filtering algorithm could be applied. To this end, matrix factorization techniques may be applied by the ML process. Moreover, still in step S610, the trained recommender system (i.e., potential candidates for CM parameter values recommendations) may be evaluated on some or all the non-synthetic data obtained in step S602. The synthetic data might be excluded from the evaluation process so as not to falsify the evaluation result.

In a further step S612, the trained ML process recommends CM parameter values (including parameter settings) for a given RAN. The CM parameter settings may be recommended such that one or more KPIs of the given RAN are improved (e.g., optimized). In a still further step not shown in FIG. 6, the RAN (e.g., one or more cells thereof) may be configured in accordance with the recommended CM parameter values.

In the following, the various steps illustrated in FIG. 6 will be discussed in greater detail with reference to FIGS. 7 to 11. In the following discussion, the synthetic data generation apparatus 200 applies a modified cGAN to generate synthetic data, which will be used as additional training data to train a CM parameter recommender system such as a ML process.

In a more detailed implementation of step S602, a set of authentic data samples, x, and labels of the samples (i.e., conditional values), c, are obtained and prepared as input for cGAN training. In one variant, x is a vector comprising or consisting of CM parameter values and cell characteristic parameter values, and c corresponds to one or more performance indicator values associated with the CM parameter values and the cell characteristic parameter values. The performance indicator values have been observed (e.g., measured) from one or more live mobile networks. Alternatively, or in addition, the performance indicator values are observed (e.g., measured) in a testing (e.g., laboratory) environment.

Examples of CM parameters that are configurable during RAN operation include physical uplink control channel (PUCCH) power boost, service specific discontinuous reception (DRX), and so on.

In one variant, dimension reduction techniques, such as principal component analysis (PCA), are applied to one or more CM parameters to reduce the dimension of x. In another variant, embedding is applied to some CM parameters to convert categorical parameter settings (e.g., activated/deactivated or on/off) to numerical values (e.g., 0/1 or 1/2).

Examples of cell characteristic parameters (as representations of RAN characteristic parameters) include path loss statistics, cell load statistics, inter-site distances, uplink interference statistics, and so on. These parameters may be measured, or calculated from measurements, to obtain associated cell characteristic parameter values.

The cell characteristic parameters are used to classify, or categorize, cells into cell types (i.e., to define cell types). Cell types may be defined based on a single cell characteristic parameter, for example by assigning a dedicated value of that cell characteristic parameter or a dedicated range of values to a specific cell type. Of course, different cell types can also be defined based on multiple cell characteristic parameters, wherein each cell type will then be associated with a dedicated value or dedicated range of values of each individual cell characteristic parameter.

Examples of performance indicators include aggregated user experience measures, user radio throughput statistics, signal to interference and noise ratio (SINR) statistics (e.g., cell average uplink SINR) and so on. The performance indicators may take the form of key performance indicators (KPIs). The performance indicators may be obtained on the bases of measurements.

FIG. 7 exemplifies a CM recommendation matrix 700 that could form the basis for cGAN training. In this example, users and items in a conventional recommendation matrix (see FIG. 1) are represented by cell types and RAN configurations (here: CM parameter value combinations of two CM parameters), respectively. The ratings are represented by cell average uplink SINR measured in dB. Empty spaces mean that such CM combinations have not been seen for the corresponding cell type.

For ease of explanation, the example only includes two CM parameters which have two configurable values: 1 and 2. Each value combination of these two CM parameters corresponds to a possible RAN (or more precisely: cell) configuration. In other examples, only one CM parameter or more than two parameters may need to be configured per cell, and the number of matrix columns may respectively decrease or increase.

In the example of FIG. 7, different cell types may be defined by different cell load statistics value ranges (or values of other/additional cell characteristic parameters).

With the increase of the number of configurable CM parameters in 5G and other mobile networks, and the extension of value ranges, any resulting matrix representation will become very sparsely populated since only limited CM parameter combinations will be configured in live mobile networks. Even with state-of-the-art matrix factorization methods, such as deep matrix factorization, recommendation performance is expected to be poor given the resulting sparsely populated matrix. Therefore, in step S604, the cGAN will be trained to generate synthetic data to supplement the available training samples as exemplarily shown in FIG. 7.

Figure 8:
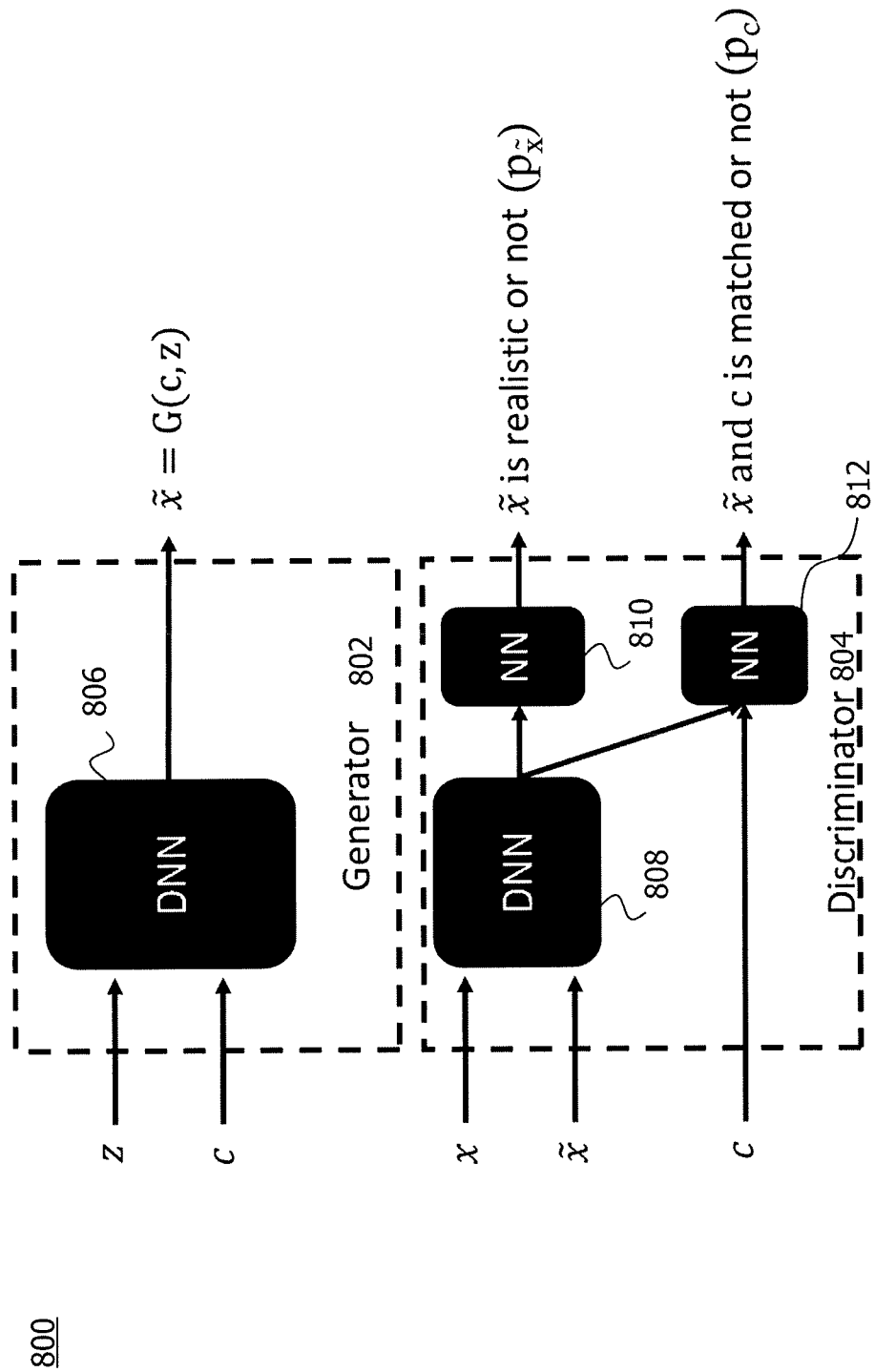
FIG. 8 is a block diagram illustrating a cGAN-based synthetic data generation apparatus embodiment of the present disclosure.

FIG. 8 illustrates an exemplary cGAN-based synthetic data generation apparatus 800 comprising a generator 802 (or "G") and a discriminator 804 (or "D"). Each of the generator 802 and discriminator 804 is built from one or multiple NNs, such as deep NNs (DNN). In more detail, the generator 802 is built from a single DNN 806. Moreover, the discriminator 804 is exemplarily built from three NNs 808, 810, 812, wherein the NN 808 is configured as a DNN. This type of discriminator design achieves fast and stable learning (see T. Miyato et al. "cGANs with Projection Discriminator", published as a conference paper at ICLR 2018; https://openreview.net/forum?id=ByS1VpgRZIt). It will be appreciated that many alternative NN realizations of the generator 802 and discriminator 804 are feasible, including building same from a single NN (e.g., a single DNN).

DNN 806 of generator 802 has two input parameters, noise input received in the form of a vector z and conditional values c, and one output of the synthetic data $\tilde{x}$. DNN 808 of discriminator 804 illustrates two inputs of the non-synthetic data x and the synthetic data $\tilde{x}$, however, a single input of either the non-synthetic data x or the synthetic data $\tilde{x}$ would be conceivable depending on the implementation. Another input of the conditional values c is fed into the discriminator 804, in particular NN 812, in order to determine whether the input of DNN 808 matches with the conditional values c.

The noise vector z follows a certain distribution, for example a normal distribution. Moreover, the noise vector z may be a latent space representation of x. The dimension of z is a hyper-parameter to tune, normally it is smaller than the length of x. The conditional values c are a scalar value or a vector and constitutes the conditional information added to both cGAN generator 802 and cGAN discriminator 804 as input.

The generator output $\tilde{x}$ is a vector in the form of a concatenation of synthetic CM parameter values, synthetic cell characteristic parameter values and synthetic performance indicator values with the same length and in the same form as x. The goal of the generator 802 is to "fool" the discriminator 804 with synthetic data. The discriminator 804 has two tasks: 1) determine if $\tilde{x}$ is realistic or not, and 2) determine if the $p_{\tilde{x}}$ pair is matched or not. The discriminator 804 might output a first probability $p_{\tilde{x}}$ indicative of its confidence whether $\tilde{x}$ is realistic or not and a second probability $P_c$ indicative of its confidence whether the ($\tilde{x}$, c) pair is matched or not.

The generator 802 and discriminator 804 may be trained in step S604 using an adversarial process with stochastic gradient ascent. In this context, a policy gradient can be employed to generate discrete data using reinforcement techniques, see J. Wang et al. "Irgan: A minimax game for unifying generative and discriminative information retrieval models", https://arxiv.org/pdf/1705.10513.pdf. The underlying cGAN training algorithm is illustrated in FIG. 9, where G stands for the generator 802 and D stands for the discriminator 804.

Figure 10:
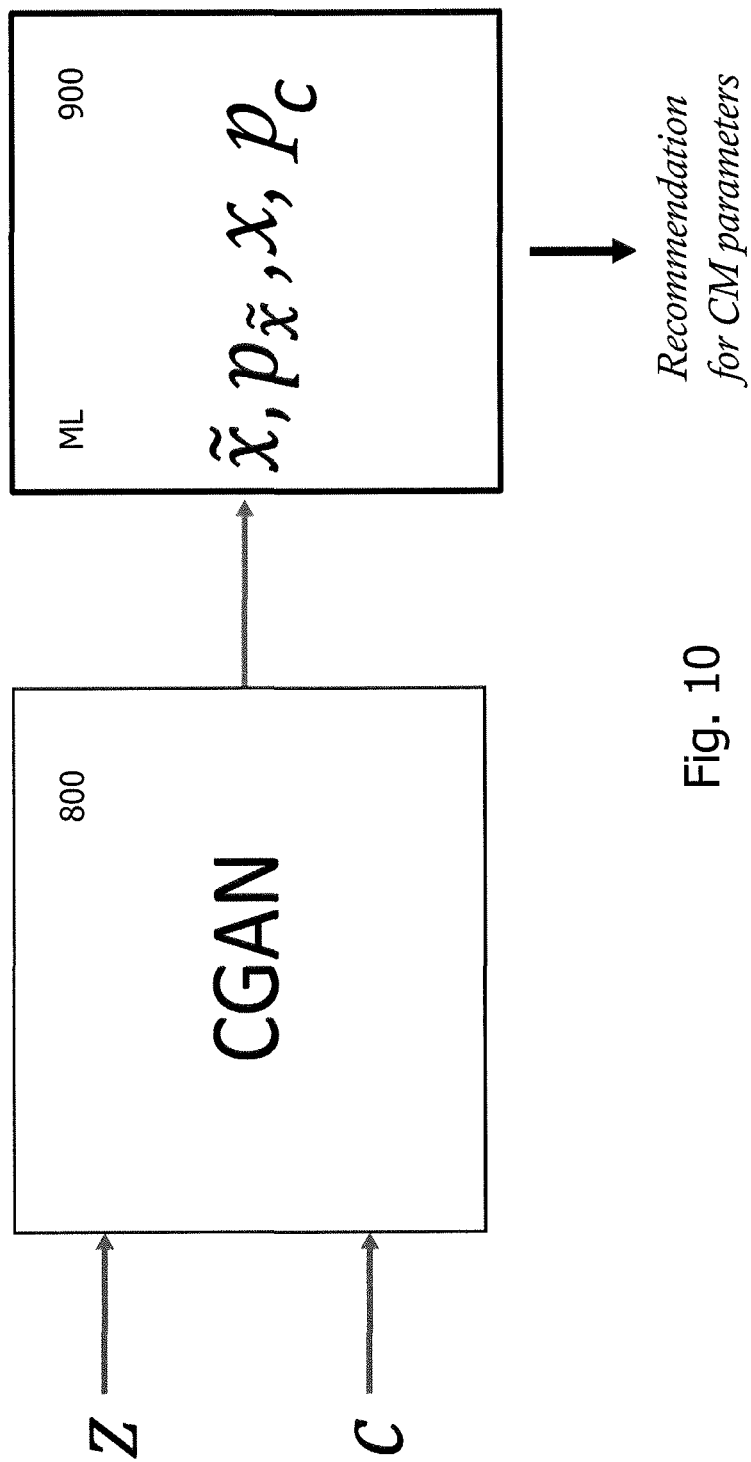
FIG. 10 is block diagram further illustrating the cGAN-based synthetic data generation apparatus embodiment of the present disclosure.

After the cGAN-based synthetic data generation apparatus 800 has been trained in step S604, it can generate—in step S606—synthetic data $\tilde{x}$ given z and c as input, as shown in FIG. 10. A first condition (e.g., threshold decision) can be defined for $p_{\tilde{x}}$ to determine whether or not the trained cGAN-based synthetic data generation apparatus 800 considers $\tilde{x}$ as realistic and therefore similar to the authentic data and/or a second condition (e.g., threshold decision) can be defined for $p_c$ to determine whether or not the trained cGAN-based synthetic data generation apparatus 800 considers the ($\tilde{x}$, c) pair as matching or not.

The synthetic data output by the cGAN-based synthetic data generation apparatus 800 is used to enhance, or supplement, a training data set to train the ML process that recommends cell configurations (see steps S608 and S610). In this context, FIG. 11 illustrates the matrix example of FIG. 7 with supplemented synthetic data (indicated in bold and italic font). As can be seen from the supplemented matrix 1100, one or more of synthetic cell configurations (i.e., CM parameter values; new column), synthetic cell types (i.e., cell characteristic parameter values or value ranges; new row) and synthetic performance indicator values can generally be supplemented. Some spaces are still left empty, for example because of associated low confidence measures.

When an output of the ML process is evaluated, only authentic data is used so that the evaluation is not biased by the synthetic data. Evaluation may include analyzing candidates for possible CM parameter value recommendations by the ML process and discarding some or all of the candidates based on a quality criterion.

Then, in step S612, the trained ML process is used to recommend CM parameter values for a specific cell configuration. In one variant, a CM parameter value combination giving the best predicted rating (e.g., KPI) value is recommended.

In the above embodiment, synthetic data comprising CM parameter values, cell characteristic parameter values and KPI values is generated using a modified cGAN. The synthetic data is used to enhance a training data set to train the ML process. The result is a more accurate recommendation of a cell configuration for a given RAN.

The proposed technique provides a solution to a key challenge when building a per-RAN or per-cell CM recommender system. By generating synthetic data from non-synthetic data, the recommender system can give recommendations on a wider range of CM parameter settings with higher accuracy. Since the synthetic data can be generated offline using an ML model, it reduces risk, time and cost compared with trying the new settings in a live mobile network. The resulting CM recommender system is an important function for automated network optimization and zero-touch network management.

The invention claimed is:

1. An apparatus for generating synthetic data as input for a machine learning process that recommends radio access network (RAN) configurations, the apparatus comprising:
processing circuitry;
memory containing instructions executable by the processing circuitry whereby the apparatus is operative to:

obtain a noise input;
generate, using a trained generative machine learning model, synthetic data from the noise input, wherein the generative machine learning model has been trained together with a discriminative machine learning model as adversaries based on non-synthetic data associating non-synthetic configuration management (CM) parameter values, non-synthetic RAN characteristic parameter values, and non-synthetic performance indicator values; wherein each non-synthetic performance indicator value indicates a performance for a given RAN configuration, as defined by one or more of the non-synthetic CM parameter values and a given RAN characteristic as defined by one or more of the non-synthetic RAN characteristic parameter values, wherein the synthetic data, in the same form as the non-synthetic data, comprises at least one of one or more synthetic CM parameter values, one or more synthetic RAN characteristic parameter values, and one or more synthetic performance indicator values; and
output the synthetic data for the machine learning process.

2. The apparatus of claim 1, wherein the trained generative machine learning model and the trained discriminative machine learning model are part of a generative adversarial network.

3. The apparatus of claim 1, wherein each RAN characteristic is representative of an RAN cell type.

4. The apparatus of claim 1:
wherein the instructions are such that the apparatus is operative to obtain conditional values; and
wherein the trained generative machine learning model is configured to generate the synthetic data also from the conditional values.

5. The apparatus of claim 4, wherein the conditional values comprise one or more non-synthetic or synthetic performance indicator values.

6. The apparatus of claim 4, wherein the conditional values comprise one or more non-synthetic RAN characteristic parameter values.

7. The apparatus of claim 4, wherein the trained generative machine learning model and the trained discriminative machine learning model are part of a conditional generative adversarial network.

8. The apparatus of claim 1, wherein the instructions are such that the apparatus is operative to:
obtain an input of either the synthetic data or the non-synthetic data;
classify the input, using the trained discriminative machine learning model, into a first predicted class of either a class of synthetic data or a class of non-synthetic data; and
output a first probability representing a confidence of the trained discriminative model that the first predicted class matches the class of synthetic data or the class of non-synthetic data.

9. The apparatus of claim 1, wherein the trained generative machine learning model has been trained using a gradient based optimization process.

10. The apparatus of claim 1, wherein the trained generative machine learning model is configured to generate one or more discrete data values comprised by the synthetic data.

11. The apparatus of claim 1, wherein the instructions are such that the apparatus is operative to be operated offline in regard to a given RAN for which the RAN configuration is to be determined.

12. The apparatus of claim 1, wherein the instructions are such that the apparatus is operative to:
train the machine learning process for recommending RAN configurations based on the non-synthetic data and the synthetic data;
recommend one or more CM parameter values using the trained recommendation process; and
output the one or more recommended CM parameter values for RAN configuration.

13. The apparatus of claim 12, wherein the instructions are such that the apparatus is operative to evaluate candidates for the one or more recommended CM parameter values based on one or more of the non-synthetic CM parameter values, the non-synthetic RAN characteristic parameter values, and the non-synthetic performance indicator values, wherein the synthetic data is excluded in the evaluation.

14. The apparatus of claim 12, wherein the instructions are such that the apparatus is operative to output, for a given RAN or RAN cell type associated with one or more given RAN characteristic parameter values, the one or more CM parameter values that fulfil a predefined criterion in regard to one or more performance indicator values.

15. An apparatus for training a generative machine learning model that outputs synthetic data as an input for a machine learning process that recommends radio access network (RAN) configurations, wherein the generative machine learning model is trained together with a discriminative machine learning model as adversaries, the apparatus comprising:
processing circuitry;
memory containing instructions executable by the processing circuitry whereby the apparatus is operative to:
obtain a noise input;
obtain non-synthetic data associating configuration management (CM) parameter values, RAN characteristic parameter values, and performance indicator values, wherein each performance indicator value indicates a performance for a given RAN configuration as defined by one or more of the non-synthetic CM parameter values and a given RAN characteristic as defined by one or more of the non-synthetic RAN characteristic parameter values;
generate, using the generative machine learning model, synthetic data from the noise input, wherein the synthetic data, in the same form as the non-synthetic data, comprises at least one of one or more synthetic CM parameter values, one or more synthetic RAN characteristic parameter values, and one or more synthetic performance indicator values;
obtain an input of either the synthetic data or the non-synthetic data and a corresponding true class;
classify the input, using the discriminative machine learning model, into a first predicted class of either a class of synthetic data or a class of non-synthetic data;
update the discriminative machine learning model by minimizing an error based on a deviation between the first predicted class and the true class; and
update the generative machine learning model by maximizing the error of the discriminative machine learning model.

16. The apparatus of claim 15, wherein the instructions are such that the apparatus is operative to update the discriminative machine learning model based on a gradient derived from the deviation between the first predicted class and the true class by using a gradient based optimization process.

17. The apparatus of claim 16, wherein the instructions are such that the apparatus is operative to update the generative machine learning model based on an inverse of the gradient using a gradient based optimization process.

18. The apparatus of claim 15, wherein the instructions are such that the apparatus is operative to update the generative machine learning model using reinforcement techniques.

19. A method for generating synthetic data as input for a machine learning process that recommends radio access network (RAN) configurations, the method comprising
obtaining a noise input;
generating, using a trained generative machine learning model, synthetic data from the noise input, wherein the generative machine learning model has been trained together with a discriminative machine learning model as adversaries based on non-synthetic data associating non-synthetic configuration management (CM) parameter values, non-synthetic RAN characteristic parameter values, and non-synthetic performance indicator values, wherein each non-synthetic performance indicator value indicates a performance for a given RAN configuration as defined by one or more of the non-synthetic CM parameter values and a given RAN characteristic as defined by one or more of the non-synthetic RAN characteristic parameter values, wherein the synthetic data, in the same form as the non-synthetic data, comprises at least one of one or more synthetic CM parameter values, one or more synthetic RAN characteristic parameter values, and one or more synthetic performance indicator values; and
outputting the synthetic data for the machine learning process.

20. A method for training a generative machine learning model that outputs synthetic data as an input for a machine learning process that recommends radio access network (RAN) configurations, wherein the generative machine learning model is trained together with a discriminative machine learning model as adversaries, the method comprising:
obtaining a noise input;
obtaining non-synthetic data associating configuration management (CM) parameter values, RAN characteristic parameter values, and performance indicator values, wherein each performance indicator value indicates a performance for a given RAN configuration as defined by one or more of the non-synthetic CM parameter values and a given RAN characteristic as defined by one or more of the non-synthetic RAN characteristic parameter values;
generating, using the generative machine learning model, synthetic data from the noise input, wherein the synthetic data, in the same form as the non-synthetic data, comprises at least one of one or more synthetic CM parameter values, one or more synthetic RAN characteristic parameter values and one or more synthetic performance indicator values;
obtaining an input of either the synthetic data or the non-synthetic data and a corresponding true class;
classifying the input, using the discriminative machine learning model, into a first predicted class of either a class of synthetic data or a class of non-synthetic data;
updating the discriminative machine learning model by minimizing an error based on a deviation between the first predicted class and the true class; and
updating the generative machine learning model by maximizing the error of the discriminative machine learning model.

* * * * *